United States Patent [19]

Bradley

[11] Patent Number: 4,627,774

[45] Date of Patent: Dec. 9, 1986

[54] LIMITING TORQUE BOLT-NUT ASSEMBLY

[75] Inventor: Earl T. Bradley, Frisco, Tex.

[73] Assignee: Ebaa Iron Inc., Eastland, Tex.

[21] Appl. No.: 737,807

[22] Filed: May 23, 1985

[51] Int. Cl.⁴ .................... F16B 23/00; F16B 35/06
[52] U.S. Cl. ..................................... 411/5; 411/410
[58] Field of Search .............. 411/1, 2, 3, 4, 5, 6,
411/7, 8, 371, 372, 373, 402, 410, 910, 911;
70/229, 231

[56] References Cited

U.S. PATENT DOCUMENTS

| | | | |
|---|---|---|---|
| 3,191,486 | 6/1965 | Gibbens | 411/4 |
| 3,280,689 | 10/1966 | Rubin | 411/6 |
| 3,602,976 | 9/1971 | Grube | 411/2 X |
| 3,929,054 | 12/1975 | Gutshall | 411/5 |
| 4,046,052 | 9/1977 | Nordstrom | 411/1 |
| 4,092,036 | 5/1978 | Sato et al. | 411/378 X |
| 4,131,816 | 2/1979 | Gartner | 411/2 |
| 4,144,796 | 3/1979 | Richter | 411/4 |
| 4,504,180 | 3/1985 | Ishii et al. | 411/5 |

FOREIGN PATENT DOCUMENTS

| | | | |
|---|---|---|---|
| 802433 | 2/1951 | Fed. Rep. of Germany | 411/402 |
| 2658996 | 6/1978 | Fed. Rep. of Germany | 411/4 |
| 457643 | 5/1950 | Italy | 411/371 |

Primary Examiner—Thomas J. Holko
Attorney, Agent, or Firm—H. Mathews Garland

[57] ABSTRACT

A limited torque bolt-nut assembly including a bolt shank having a threaded first end portion and a non-threaded second end portion, a secondary drive head on the second shank portion and a primary shearable drive head on the secondary drive head, and a hollow nut secured over both drive heads and a portion of the non-threaded shank section. The hollow nut drives the primary drive head which rotates relative to the secondary drive head until the primary drive head shears off at a predetermined torque releasing the nut and primary drive head. The secondary drive head remains on the bolt shank for adjustment and removal of the bolt.

12 Claims, 2 Drawing Figures

LIMITING TORQUE BOLT-NUT ASSEMBLY

BACKGROUND OF THE INVENTION

This invention relates to bolt and nut assemblies and more particularly relates to a bolt and nut assembly adapted to be tightened until a predetermined amount of torque force has been applied to the bolt shank.

HISTORY OF THE PRIOR ART

In a number of different mechanical structures utilizing a variety of bolt designs it is desirable to be able to control the amount of torque applied to the bolt shank for tightening the bolt to a desired degree. One of the applications in which it is particularly desirable to use a limited torque bolt is a pipe coupling secured on a pipe by set screws. Such set screws generally screw radially through an annular gland around a pipe against the outer pipe surface. It will be apparent that if such set screws are tightened beyond a predetermined degree the pipe surface will be damaged. One particular application of a set screw in a pipe gland is shown in U.S. Pat. No. 4,092,036 issued to Sato et al, May 30, 1978. The pipe gland structure shown in U.S. Pat. No. 4,092,036 includes an annular body or gland 10, bolts 30, and pipe pressing members 35. Each of the bolts 30 engages a pipe pressing member 35 which is forced by the bolt inwardly within the gland to engage the outer face of the pipe surface. It will be obvious in U.S. Pat. No. 4,092,036 if any one or more of the bolts is tightened with too great a force the member 35 on the bolts may be forced inwardly with too great a force damaging the pipe surface. Thus, it is desirable to replace each of the bolts 30 in U.S. Pat. No. 4,092,036 with a bolt which is of the limited torque type so that only a predetermined amount of torque may be applied to the bolts.

In the prior art there are at least two general types of limited torque nut and bolt assemblies. One such type includes a nut having an outer shell which fractures when a desired amount of torque is applied to the nut so that the nut cannot be further tightened. U.S. Pat. Nos. showing such a type of limited torque apparatus are 3,667,339 issued June 6, 1972 to Dame, 3,854,372 issued Dec. 17, 1974 to Gutshall, and 4,068,555 issued Jan. 17, 1978 to Volkman. Another type of limited torque bolt in the prior art includes a driving head which shears from the bolt at a predetermined torque. Such a limited torque bolt using a single driving head is shown in U.S. Pat. No. 3, 498,174, issued Mar. 3, 1970 to Schuster, et al. Other limited torque bolts utilizing two driving heads, one of which shears off, are shown in U.S. Pat. Nos. 3,595,124, issued July 27, 1971 to Lindstrand, et al and 3,812,757 issued May 28, 1974 to Reiland.

The present invention is a limited torque bolt and nut assembly of the latter type, using two drive heads, one of which shears from the bolt shank when the desired amount of torque is applied to the bolt. One of the particular problems with the prior art limited torque bolts utilizing two drive heads is that the shearable drive head may accidently be broken from the bolt shank before it has performed its function. Another problem with such bolts is that unless a wrench is available which fits the shearable drive head the user may apply the torque force to the other drive head, and thus, the bolt will not perform the limited torque function and can be tightened too tightly. Also, it has been known that a workman using such bolts may intentionally vandalize the bolts by deliberatly breaking off the shearable drive heads.

SUMMARY OF THE INVENTION

It is a principal object of the present invention to provide a new and improved limited torque type nut and bolt assembly.

It is another object of the invention to provide a limited torque type device of the character described which is not subject to abuse by workmen destroying the limited torque feature of the apparatus without tightening the bolt to the desired degree of torque.

It is another object of the invention to provide a limited torque type nut and bolt assembly which is designed to use standard wrenches.

It is a further object of the invention to provide a limited torque type nut and bolt assembly which utilizes a primary, shearable drive head, a secondary drive head, and a protective drive nut covering the primary and secondary drive heads on the bolt shank during the application of torque to the bolt.

It is another object of the invention to provide a limited torque type nut and bolt assembly which is especially adapted for use with a pipe gland such particularly as shown in U.S. Pat. No. 4,092,036.

In accordance with the invention there is provided a limited type nut and bolt assembly which includes a bolt shank threaded along a first end portion and having a smooth cylindrical second end portion, a secondary drive head on the second end portion, a primary shearable drive head on the secondary drive head adapted to shear from the secondary drive head at a predetermined torque, and a hollow drive nut having internal drive surfaces and mounted over the primary and secondary drive heads and a portion of the bolt shank for turning the bolt shank by applying force to the primary shearable drive head while being rotatable relative to the secondary drive head.

BRIEF DESCRIPTION OF THE DRAWING

The foregoing objects and advantages together with the specific details of a preferred embodiment of a limited torque type nut and bolt assembly in accordance with the invention may be understood from the following detailed description thereof taken in conjunction with the accompanying drawings wherein.

DETAILED DESCRIPTION OF THE PREFERRED EMBODIMENT

Figure 2:
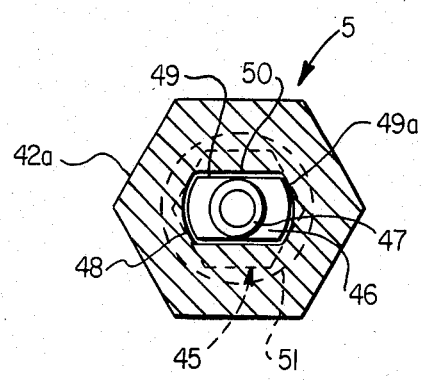
FIG. 2 is a view in section along the line 2—2 of FIG. 1.

Referring to the drawings, a limited torque nut and bolt assembly 5 includes a bolt 6 and a protective drive nut 7. The bolt 6 is a one piece or integral member having a shank 30, a central external, annular flange or thrust collar 31, a first cylindrical smooth end portion 32, a second threaded opposite end portion 33, a secondary drive head 45 on the first shank end portion, a primary shearable drive head or lug 46 on the drive head 45, and a retaining rivet 47 formed on the primary drive head. The threaded shank portion 33 is, of course, sized and threaded to fit whatever member the bolt is designed to engage, such, for example, as the pipe pressing member 35 shown in U.S. Pat. No. 4,092,036. The flange 31 is an annular flange on the bolt shank adapted to provide a thrust function against the member 12 which is a clamping block portion of the annular body 10 shown in U.S. Pat. No. 4,092,036. The member 12 has a smooth bore or hole 29 through which the smooth bolt shank second end portion 32 fits so that the bolt shank rotates freely in the member 12. The secondary drive head 45 has a plurality of flat side drive faces 45a, and the head in the preferred form shown is hexagon shaped engagable by a standard wrench. The primary drive head or lug 46 is smaller than the drive head 45 and preferably is elongated in shape as shown in FIG. 2 having flat opposite side drive faces 49 and curved opposite end side faces 49a. The primary drive head is designed to shear from the secondary drive head 45 when a predetermined torque force is applied to the drive nut 7. The primary drive cap has been shaped so that it may be cast accurately and repeatedly to yield a predictable failure torque in the same range for each of the bolts. The rivet 47 is a flanged upwardly extending protrusion on the primary drive head 46 serving as a retainer to hold the drive nut 7 on the bolt.

Figure 1:
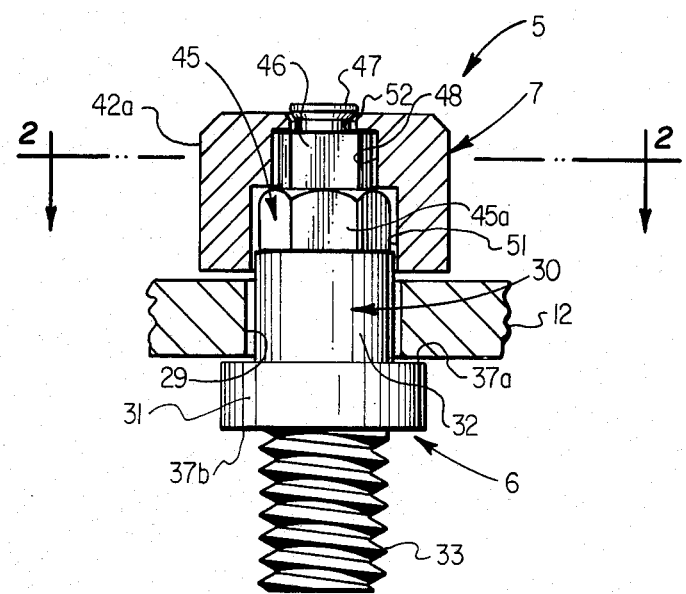
FIG. 1 is a side view in section and elevation of a limited torque type nut and bolt assembly embodying the invention and including apparatus of the pipe junction holder shown in U.S. Pat. No. 4,092,036.

The hollow drive nut 7 is provided with flat side drive faces 42a and, preferably, is a conventional hexagon shaped member provided with a first internal cylindrical cavity 51 sized to fit over the secondary drive head 45 and the upper end portion of the shank portion 30 of the bolt shank. The first cylindrical cavity 51 is sufficently larger than the bolt shank portion 32 and the secondary drive head 45 that the cap will freely rotate on the shank and drive head. The first nut cavity 51 opens into a second smaller nut cavity 48 which is shaped to closely fit around the primary drive head 46 and has flat side cavity walls engagable with the flat sides 49 of the primary drive head. The shape of the second cavity 48 of the cap provides a close fit of the primary drive head within the cavity so that when the nut 7 is rotated it turns the primary drive head 46. Preferably the nut 7 is sized to accept a standard wrench. The nut 7 has a top hole or opening 52 through which the rivet 47 projects. In securing the nut 7 on the bolt, the rivet 47 is deformed sufficiently to provide an annular retaining flange on the rivet which holds the nut 7 on the bolt shank over the primary and secondary drive heads and a short portion of the bolt shank section 30. In the operation of the particular form of the limited torque nut and bolt assembly 5 of the invention, the assembly is initially secured with the member 12 as shown in FIG. 1 by inserting the bolt through the hole 29 in the member 12 until the flange 31 is against the bottom face of the member 12 with the flange surface 37a engagable with the bottom surface of the member 12 and the bolt portion 32 disposed through the hole 29. The nut 7 is then placed over the primary drive head 46 and secondary drive head 45 as shown in FIG. 1. The rivet 47 is then deformed sufficiently to retain the nut 7 on the bolt. A short portion of the lower end of the nut 7 fits over a short upper portion of the shank portion 32 of the bolt.

When the nut and bolt assembly is to be tightened, a wrench is engaged on the hollow nut 7 with the drive surfaces of the wrench contacting the flat drive side faces 42a of the nut. The nut 7 is then rotated by the wrench turning the bolt shank with the threaded end portion 33 of the bolt shank rotating in the member, not shown, in which the bolt is to be tightened. When the hollow nut has been rotated sufficently that the wrench is applying the desired predetermined torque to the bolt, as when the member 35 in U.S. Pat. No. 4,092,036 sufficiently engages the pipe surface, the primary drive head 46 shears from the secondary drive head 45. With the primary drive head sheared from the secondary drive head, the hollow nut 7 along with the primary drive head 46 and the rivet 47 securing the drive head and the nut are removed from the bolt shank. The secondary drive head 45 remaining on the bolt shank is now fully exposed. The secondary drive head may be used if a final adjustment of the bolt is necessary and the secondary head is available for loosening the bolt when needed. The secondary drive head shape and size accepts a conventional wrench which may be fitted on the head to rotate the bolt.

While a particular form of the limited torque bolt and nut assembly 5 has been described and illustrated including the thrust collar 31, it will be evident that in applications requiring limited torque bolts without a thrust collar, the collar 31 may be eliminated from the bolt shank so that the bolt shank comprises only the threaded portion 33 and the smooth cylinderical portion 32.

It will be evident that a new and improved limited torque nut and bolt assembly has been provided which includes a shearable primary drive head protected by a hollow nut. As seen in FIG. 1 a portion of the nut 7 overlaps the smooth shank portion 32 of the bolt so that a blow to the side of the nut will not accidentally shear the primary drive head 46 from the secondary drive head. An accidental side blow to the nut will thus not render the assembly inoperative. The nut and the primary drive head are removed only by application of the desired amount of torque force. Standard wrenches may be employed on both the primary and the secondary drive heads. The secondary drive head remains a portion of the bolt for required adjustments after the primary drive head is sheared off and for removeable of the bolt.

What is claimed is:

1. A torque limiting bolt-nut assembly comprising:
   a bolt having a threaded shank;
   a secondary drive head on said shank;
   a shearable primary drive head on said secondary drive head; and
   a hollow drive nut over said primary and secondary drive heads and a portion of said shank, said drive nut being adapted to turn said primary drive head and being rotatable relative to said secondary drive head and said shank.

2. A torque limiting bolt-nut assembly in accordance with claim 1 wherein said primary drive head shears from said secondary drive head responsive to a predetermined torque value applied to said nut detaching said primary drive head and said nut from said secondary drive head and said shank.

3. A torque limiting bolt-nut assembly in accordance with claim 2 wherein said drive nut has a first internal socket portion receiving said secondary drive head and said shank portion and a second socket portion aligned coaxially with said first socket portion for receiving said primary drive head.

4. A torque limiting bolt-nut assembly in accordance with claim 3 wherein said primary drive head is smaller than said secondary drive head and is provided with flat opposite side driving faces.

5. A torque limiting bolt-nut assembly in accordance with claim 4 including a rivet head on said primary drive head and a central hole in said drive nut for receiving said rivet head for attaching said nut on said bolt.

6. A torque limiting bolt-nut assembly in accordance with claim 5 wherein said drive nut and said secondary drive head are substantially hexagon shaped and said primary drive head and said second socket portion of said nut are substantially rectangular shaped.

7. A torque limiting bolt-nut assembly in accordance with claim 6 including an annular thrust flange on said bolt shank.

8. A limited torque bolt-nut assembly comprising:
a bolt shank having a threaded first end portion and a cylindrical non-threaded second end portion;
a secondary drive head on said second shank portion;
a shearable primary drive head on said secondary drive head;
a rivet on said primary drive head; and
a hollow drive nut over an end portion of said second shank portion, said secondary drive head, said primary drive head, and said rivet, said nut having a central end hole in a first end thereof receiving said rivet for holding said nut on said bolt, a first cylindrical cavity opening through the opposite end of said nut larger than said secondary drive head and said non-threaded shank portion and rotatable relative to said secondary drive head and said non-threaded shank portion, and a second cavity opening at one end to said first cavity and at the opposite end to said rivet hole, said second cavity being configured to closely fit around said primary drive head for turning said primary drive head responsive to rotation of said nut, said nut having outside drive faces for engagement by a wrench.

9. A torque limiting bolt-nut assembly in accordance with claim 8 wherein said primary drive head is smaller than said secondary drive head and is sized to shear from said secondary drive head responsive to a predetermined torque applied to said nut.

10. A torque limiting bolt-nut assembly in accordance with claim 9 wherein said primary drive head and said second cavity of said nut are substantially rectangular in shape.

11. A torque limiting bolt-nut assembly in accordance with claim 10 wherein said secondary drive head and said drive nut are substantially hexagon shaped and sized to receive standard wrenches.

12. A torque limiting bolt-nut assembly in accordance with claim 8 including an annular thrust flange on said bolt shank between said threaded portion and said non-threaded portion.

* * * * *